(12) United States Patent
Shirasaki et al.

(10) Patent No.: US 11,611,673 B2
(45) Date of Patent: Mar. 21, 2023

(54) SHEET FEEDING APPARATUS AND IMAGE FORMING SYSTEM

(71) Applicant: KYOCERA Document Solutions Inc., Osaka (JP)

(72) Inventors: Seiichi Shirasaki, Osaka (JP); Ryosuke Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/700,340

(22) Filed: Mar. 21, 2022

(65) Prior Publication Data
US 2022/0321722 A1 Oct. 6, 2022

(30) Foreign Application Priority Data
Mar. 31, 2021 (JP) .............................. JP2021-061225

(51) Int. Cl.
*H04N 1/00* (2006.01)

(52) U.S. Cl.
CPC ....... *H04N 1/00689* (2013.01); *H04N 1/0062* (2013.01); *H04N 1/0066* (2013.01);
(Continued)

(58) Field of Classification Search
CPC ............ B65H 2801/06; B65H 2801/27; B65H 2220/01; B65H 2511/20; B65H 2301/4213; B65H 31/02; B65H 2220/02; B65H 37/04; B65H 2511/51; B65H 31/36; B65H 31/34; B65H 1/14; B65H 2301/4212; B65H 31/10; B65H 2405/11151; B65H 2511/30; B65H 7/02; B65H 31/26; B65H 2220/11; B65H 31/3027; B65H 2511/15; B65H 29/14; B65H 1/04; B65H 2220/03; B65H 2511/414; B65H 33/08; B65H 2405/15; B65H 2511/515; B65H 31/38; B65H 43/00; B65H 2553/61; B65H 5/062; B65H 3/06;
(Continued)

(56) References Cited

U.S. PATENT DOCUMENTS

| | | | |
|---|---|---|---|
| 8,540,236 B2 * | 9/2013 | Ohtani | B65H 1/08 271/157 |
| 8,876,105 B2 * | 11/2014 | Ohtani | B65H 7/04 271/157 |

(Continued)

FOREIGN PATENT DOCUMENTS

JP 2008-050144 3/2008

*Primary Examiner* — Negussie Worku
(74) *Attorney, Agent, or Firm* — Stein IP, LLC

(57) ABSTRACT

A sheet feeding apparatus includes a control unit. After finishing feeding the sheet, if the sheet detection unit does not detect the sheet when the lift plate is positioned at the sheet feeding position, the control unit sets the waiting position to a lowest position. Further, if the sheet detection unit detects the sheet and if the remaining amount detection unit detects that the remaining amount of the sheets is a predetermined amount or less, the control unit sets the waiting position to a height position between the sheet feeding position and the lowest position. Further, if the sheet detection unit detects the sheet and if the remaining amount detection unit detects that the remaining amount of the sheets is more than the predetermined amount, the control unit sets the waiting position to the lowest position.

10 Claims, 10 Drawing Sheets

(52) U.S. Cl.
CPC ..... *H04N 1/00602* (2013.01); *H04N 1/00644* (2013.01); *H04N 1/00694* (2013.01); *H04N 1/00734* (2013.01); *H04N 1/00774* (2013.01)

(58) Field of Classification Search
CPC .... B65H 31/3081; B65H 43/06; B65H 45/18; B65H 31/24; B65H 2513/512; B65H 2701/1313; B65H 3/0684; B65H 7/04; B65H 7/20; B65H 2511/10; B65H 2511/514; B65H 7/06; B65H 2404/1114; B65H 2511/12; B65H 2511/22; B65H 3/128; B65H 1/266; B65H 2801/03; B65H 29/125; B65H 1/18; B65H 2405/351; B65H 2511/11; B65H 2513/51; B65H 2511/24; B65H 29/20; B65H 7/14; B65H 1/08; B65H 2404/1521; B65H 2511/212; B65H 2553/412; B65H 2701/1315; B65H 3/48; B65H 2405/332; B65H 2408/1222; B65H 2513/10; B65H 2301/331; B65H 2301/3621; B65H 2511/415; B65H 2511/52; B65H 2513/50; B65H 2513/40; B65H 2404/144; B65H 2404/693; B65H 2511/13; B65H 2515/10; B65H 29/22; B65H 29/52; B65H 43/08; B65H 9/006; B65H 2404/63; B65H 2553/414; B65H 3/5261; B65H 37/06; B65H 2301/163; B65H 2301/51611; B65H 2402/10; B65H 2403/512; B65H 2407/21; B65H 2513/42; B65H 2701/18292; B65H 3/0669; B65H 31/20; B65H 5/06; B65H 2301/44324; B65H 2404/11; B65H 2404/1118; B65H 2405/324; B65H 2701/1311; B65H 31/3018; B65H 39/10; B65H 43/04; B65H 9/04; B65H 2404/143; B65H 2405/11164; B65H 2513/41; B65H 2601/271; B65H 29/145; B65H 3/14; B65H 7/125; B65H 2220/09; B65H 2301/42146; B65H 2301/4222; B65H 2403/942; B65H 2511/214; B65H 2701/1131; B65H 3/0607; B65H 7/18; B65H 9/166; B65H 2404/1442; B65H 2404/265; B65H 2405/115; B65H 2513/52; B65H 2801/39; B65H 2801/48; B65H 29/70; B65H 9/002; B65H 2301/42262; B65H 2301/5113; B65H 2405/1117; B65H 2405/313; B65H 31/00; B65H 43/02; B65H 2301/422; B65H 2404/61; B65H 2405/114; B65H 2405/11425; B65H 2511/17; B65H 2511/216; B65H 2511/524; B65H 2553/30; B65H 2555/26; B65H 3/44; B65H 5/26; B65H 1/025; B65H 1/26; B65H 2301/511; B65H 2403/42; B65H 2404/2693; B65H 2405/354; B65H 2408/121; B65H 2511/416; B65H 2601/26; B65H 2601/321; B65H 29/00; B65H 29/50; B65H 29/60; B65H 3/52; B65H 3/565; B65H 31/18; B65H 31/22; B65H 45/30; B65H 1/28; B65H 2301/1635; B65H 2301/42192; B65H 2301/51214; B65H 2403/544; B65H 2404/14; B65H 2404/1441; B65H 2404/73; B65H 2405/10; B65H 2405/331; B65H 2511/512; B65H 2511/521; B65H 2553/80; B65H 2553/82; B65H 2557/23; B65H 2601/325; B65H 2601/521; B65H 2801/24; B65H 29/34; B65H 29/40; B65H 29/48; B65H 29/62; B65H 3/0661; B65H 3/68; B65H 31/04; B65H 31/08; B65H 31/3045; B65H 39/00; B65H 9/004; B65H 2301/42194; B65H 2301/43828; B65H 2301/45; B65H 2402/31; B65H 2402/60; B65H 2403/411; B65H 2404/166; B65H 2405/11162; B65H 2405/113; B65H 2405/353; B65H 2511/21; B65H 2511/222; B65H 2511/40; B65H 2511/417; B65H 2515/20; B65H 2515/30; B65H 2515/32; B65H 2515/34; B65H 2515/70; B65H 2553/83; B65H 2701/13212; B65H 2801/09; B65H 2801/12; B65H 29/58; B65H 3/46; B65H 31/3036; B65H 31/3054; B65H 31/3063; B65H 5/36; B65H 7/08; B65H 2220/04; B65H 2301/43821; B65H 2402/441; B65H 2403/51; B65H 2403/514; B65H 2403/5321; B65H 2404/1112; B65H 2404/141; B65H 2404/147; B65H 2405/32; B65H 2406/3662; B65H 2406/41; B65H 2408/1131; B65H 2408/125; B65H 2511/528; B65H 2515/60; B65H 2515/84; B65H 2551/20; B65H 2553/81; B65H 2701/11132; B65H 2701/18267; B65H 2701/1829; B65H 2701/1916; B65H 3/124; B65H 3/64; B65H 31/32; B65H 33/04; B65H 35/0086; B65H 39/04; B65H 39/042; B65H 5/224; B65H 85/00; B65H 9/101; B65H 9/16; B65H 2301/36212; B65H 2301/4219; B65H 2301/4318; B65H 2301/44322; B65H 2301/4461; B65H 2301/5122; B65H 2301/51232; B65H 2301/51616; B65H 2402/32; B65H 2403/513; B65H 2403/53; B65H 2403/531; B65H 2403/60; B65H 2404/14211; B65H 2404/152; B65H 2404/742; B65H 2405/111; B65H 2405/1134; B65H 2405/1144; B65H 2405/12; B65H 2513/20; B65H 2553/00; B65H 2553/23; B65H 2555/25; B65H 2557/242; B65H 2601/125; B65H 2601/22; B65H 2601/524; B65H 2701/11312; B65H 2701/131; B65H 2701/19; B65H 29/12; B65H 29/246; B65H 29/51; B65H 3/0615; B65H 3/34; B65H 39/11; B65H 45/04; B65H 9/00; B65H 9/10; B65H 1/12; B65H 1/16; B65H 1/20; B65H 1/24; B65H 2301/10; B65H 2301/13; B65H 2301/133; B65H 2301/162; B65H 2301/23; B65H 2301/421; B65H 2301/42242; B65H 2301/42252; B65H 2301/42256; B65H 2301/42266; B65H 2301/4452; B65H 2301/44712; B65H 2301/4474; B65H 2301/4505; B65H 2301/50; B65H 2301/51212; B65H 2301/512125; B65H 2301/51256; B65H 2301/5133; B65H 2301/516; B65H 2301/5161; B65H 2301/5321; B65H 2402/35; B65H 2402/44; B65H 2402/45; B65H 2403/41;

B65H 2404/1411; B65H 2404/1422; B65H 2404/1424; B65H 2404/54; B65H 2404/6111; B65H 2404/6112; B65H 2404/691; B65H 2404/732; B65H 2404/733; B65H 2404/741; B65H 2405/11152; B65H 2405/11161; B65H 2405/1136; B65H 2405/325; B65H 2405/3311; B65H 2406/12; B65H 2511/224; B65H 2513/11; B65H 2513/23; B65H 2515/81; B65H 2551/00; B65H 2553/416; B65H 2553/51; B65H 2557/12; B65H 2557/33; B65H 2557/63; B65H 2601/251; B65H 2601/252; B65H 2601/2525; B65H 2601/322; B65H 2701/1211; B65H 2701/176; B65H 2701/18271; B65H 2701/1924; B65H 2801/15; B65H 2801/21; B65H 2801/31; B65H 29/041; B65H 29/38; B65H 29/66; B65H 3/56; B65H 31/12; B65H 31/14; B65H 37/00; B65H 45/16; B65H 7/12; B65H 7/16; B65H 83/00; B65H 9/06; B65H 9/20; B65H 11/00; B65H 11/02; B65H 15/004; B65H 2301/121; B65H 2301/16; B65H 2301/17; B65H 2301/22; B65H 2301/31; B65H 2301/3122; B65H 2301/324; B65H 2301/333; B65H 2301/33312; B65H 2301/361; B65H 2301/42124; B65H 2301/4223; B65H 2301/42265; B65H 2301/42344; B65H 2301/4263; B65H 2301/4382; B65H 2301/43823; B65H 2301/44331; B65H 2301/4451; B65H 2301/4478; B65H 2301/5126; B65H 2301/5152; B65H 2301/541; B65H 2402/443; B65H 2403/47; B65H 2403/511; B65H 2403/72; B65H 2403/723; B65H 2403/732; B65H 2404/10; B65H 2404/1321; B65H 2404/1341; B65H 2404/1416; B65H 2404/1451; B65H 2404/1522; B65H 2404/232; B65H 2404/531; B65H 2404/5311; B65H 2404/68; B65H 2404/696; B65H 2404/72; B65H 2404/7231; B65H 2404/74; B65H 2404/7412; B65H 2405/11; B65H 2405/1111; B65H 2405/1114; B65H 2405/1142; B65H 2405/121; B65H 2405/582; B65H 2405/5831; B65H 2405/5832; B65H 2406/11; B65H 2408/10; B65H 2408/113; B65H 2408/12; B65H 2408/122; B65H 2511/112; B65H 2511/135; B65H 2511/18; B65H 2511/25; B65H 2513/412; B65H 2515/805; B65H 2515/82; B65H 2551/10; B65H 2553/10; B65H 2553/21; B65H 2553/24; B65H 2553/26; B65H 2553/27; B65H 2553/44; B65H 2555/20; B65H 2557/13; B65H 2557/264; B65H 2601/2531; B65H 2601/525; B65H 2701/11232; B65H 2701/11238; B65H 2701/1912; B65H 2701/1932; B65H 29/008; B65H 29/44; B65H 3/00; B65H 3/063; B65H 3/0638; B65H 3/5215; B65H 3/5223; B65H 3/5246; B65H 3/62; B65H 31/28; B65H 31/3009; B65H 31/3072; B65H 33/00; B65H 35/0033; B65H 35/0073; B65H 35/06; B65H 35/08; B65H 35/10; B65H 37/02; B65H 39/02; B65H 45/12; B65H 45/142; B65H 5/00; B65H 5/066; B65H 5/068; B65H 5/10; B65H 5/14; B65H 5/34; B65H 5/38; B65H 7/00; B65H 83/02; G03G 15/6529; G03G 15/6541; G03G 2215/00827; G03G 15/6544; G03G 15/6552; G03G 15/6538; G03G 15/6511; G03G 2215/00421; G03G 15/6502; G03G 21/1633; G03G 15/6567; G03G 15/30; G03G 15/50; G03G 15/65; G03G 15/6573; G03G 2221/1672; G03G 2215/00371; G03G 2215/00544; G03G 2215/00561; G03G 2215/00734; G03G 15/6582; G03G 2215/00586; G03G 15/655; G03G 2215/00877; G03G 15/00; G03G 2215/00822; G03G 2215/00945; G03G 15/6555; G03G 2215/00911; G03G 2215/00936; G03G 15/607; G03G 21/00; G03G 15/5029; G03G 15/6508; G03G 2215/00383; G03G 15/502; G03G 15/70; G03G 2215/00818; G03G 2215/00848; G03G 15/20; G03G 15/553; G03G 15/60; G03G 15/605; G03G 15/6564; G03G 2215/00375; G03G 2215/00599; G03G 2215/00729; G03G 2215/00759; G03G 2215/00772; G03G 2221/1645; G03G 15/6547; G03G 15/6594; G03G 21/206; G03G 2215/00185; G03G 2215/00426; G03G 2215/00447; G03G 2215/00523; G03G 2215/00814; G03G 2215/00894; G03G 2215/00949; G03G 15/167; G03G 15/23; G03G 15/5012; G03G 15/5016; G03G 15/5079; G03G 15/602; G03G 15/6505; G03G 15/657; G03G 15/6591; G03G 21/1695; G03G 2215/00126; G03G 2215/00202; G03G 2215/00468; G03G 2215/00548; G03G 2215/00556; G03G 2215/00746; G03G 2215/00751; G03G 2215/00831; G03G 2215/00852; G03G 2215/00864; G03G 2215/0089; G03G 2215/00915; G03G 2215/0119; G03G 2215/0132; G03G 2215/0135; G03G 2221/1642; G03G 15/0808; G03G 15/2003; G03G 15/221; G03G 15/5062; G03G 15/5095; G03G 15/55; G03G 15/6514; G03G 15/652; G03G 15/6523; G03G 15/6532; G03G 15/703; G03G 15/751; G03G 21/0005; G03G 21/1628; G03G 21/1638; G03G 2215/00215; G03G 2215/00324; G03G 2215/00329; G03G 2215/0035; G03G 2215/00497; G03G 2215/00552; G03G 2215/00582; G03G 2215/00616; G03G 2215/00725; G03G 2215/00738; G03G 2215/00789; G03G 2215/0086; G03G 2215/00869; G03G 2215/00902; G03G 2215/2045; G03G 2221/1675; G03G 2221/169; H04N 1/00602; H04N 1/00649; H04N 2201/0094; H04N 1/00037; H04N 1/0032; H04N 1/00567; H04N 1/0057; H04N 1/00082; H04N 1/00588; H04N 1/00591; H04N 1/00612; H04N 1/00615; H04N 1/00639; H04N 1/00795; H04N 1/00801; H04N 1/00931; H04N 1/2307;

H04N 1/54; H04N 1/62; H04N 1/00278; H04N 1/00408; H04N 1/00411; H04N 1/00482; H04N 1/00628; H04N 1/00631; H04N 1/00633; H04N 1/00652; H04N 1/00663; H04N 1/00681; H04N 1/00814; H04N 1/00885; H04N 1/00888; H04N 1/00899; H04N 1/00901; H04N 1/0097; H04N 1/0473; H04N 1/12; H04N 1/193; H04N 1/233; H04N 1/2353; H04N 1/4015; H04N 1/6044; H04N 2201/0041; H04N 2201/0072; H04N 2201/0081; H04N 2201/0084; H04N 2201/04756; H04N 2201/04794; H04N 1/00; H04N 1/00005; H04N 1/00074; H04N 1/00206; H04N 1/00283; H04N 1/00384; H04N 1/00416; H04N 1/00437; H04N 1/00474; H04N 1/00594; H04N 1/00618; H04N 1/00623; H04N 1/00641; H04N 1/00644; H04N 1/00657; H04N 1/00689; H04N 1/00702; H04N 1/00708; H04N 1/00798; H04N 1/00816; H04N 1/00925; H04N 1/00928; H04N 1/00952; H04N 1/00957; H04N 1/2323; H04N 1/2361; H04N 1/2369; H04N 1/295; H04N 1/32101; H04N 1/3247; H04N 1/32486; H04N 2201/3205; H04N 2201/3232; H04N 2201/3271; H04N 2201/3288

USPC .................................................. 358/498

See application file for complete search history.

(56) References Cited

U.S. PATENT DOCUMENTS

| | | | | |
|---|---|---|---|---|
| 10,955,786 | B2* | 3/2021 | Murata | G03G 15/6511 |
| 2014/0008867 | A1* | 1/2014 | Ohtani | B65H 7/20 |
| | | | | 271/265.01 |
| 2014/0353907 | A1* | 12/2014 | Hara | B65H 1/266 |
| | | | | 271/171 |
| 2021/0387822 | A1* | 12/2021 | Shirasaki | B65H 1/18 |
| 2022/0001682 | A1* | 1/2022 | Shirasaki | B41J 13/0009 |
| 2022/0004134 | A1* | 1/2022 | Mizuguchi | G03G 15/5054 |
| 2022/0185612 | A1* | 6/2022 | Osada | B65H 29/44 |
| 2022/0229390 | A1* | 7/2022 | Aihara | B65H 7/02 |
| 2022/0247882 | A1* | 8/2022 | Nishikawa | H04N 1/00713 |

\* cited by examiner

SHEET FEEDING APPARATUS AND IMAGE FORMING SYSTEM

INCORPORATION BY REFERENCE

This application is based upon and claims the benefit of priority from the corresponding Japanese Patent Application No. 2021-061225 filed Mar. 31, 2021, the entire contents of which are hereby incorporated by reference.

BACKGROUND

The present disclosure relates to a sheet feeding apparatus for inserting a cover paper, a slip paper, or the like between paper sheets on which images are formed by an image forming apparatus such as a copier, a facsimile, or a printer, and to an image forming system using the sheet feeding apparatus.

A conventional sheet feeding apparatus includes a sheet loading unit for loading sheets, a lift plate disposed on the sheet loading unit, a lift mechanism for moving the lift plate up and down, and a sheet feeding unit disposed above the lift plate so as to face the same, for feeding the sheet lifted by the lift plate. The sheet feeding unit includes a sheet feed roller. As a first method, when the lift plate rises and the sheet contacts with the sheet feed roller, presence or absence of the sheet on the lift plate is detected. Alternatively, as a second method, there is a method of disposing a sensor on the lift plate so as to detect presence or absence of the sheet.

When adopting the conventional technique, in the first method, presence or absence of the sheet cannot be detected until the lift plate contacts with the sheet feed roller. Therefore, presence or absence of the sheet cannot be detected before a user operates a job start button, and hence it cannot be determined whether the job can be started. In addition, there is a problem that in the state where the lift plate is contacted with the sheet feed roller, it is not convenient for the user to refill sheets to the sheet loading unit.

In addition, in the second method, if there is a remaining sheet extending over the sheet feed roller and the lift plate, when the lift plate is moved down, the sheet extending over the sheet feed roller and the lift plate does not move downward together with the lift plate. Therefore, distance between the sensor and the sheet increases. In order to detect presence or absence of the sheet, it is necessary to use an expensive sensor having a long detection distance. Thus, there is a problem that manufacturing cost of the sheet feeding apparatus is increased.

SUMMARY

A sheet feeding apparatus according to one aspect of the present disclosure includes a sheet loading unit, a lift plate, a lift mechanism, a sheet feeding unit, a sheet detection unit, a remaining amount detection unit, and a control unit. The sheet loading unit loads sheets. The lift plate is disposed in the sheet loading unit and is supported in a vertically movable manner. The lift mechanism moves the lift plate vertically. The sheet feeding unit is disposed above the lift plate so as to face the same, and it contacts with the sheet lifted by the lift plate and feeds the same. The sheet detection unit is disposed on the lift plate so as to detect whether or not the sheet is placed on the lift plate. The remaining amount detection unit detects a remaining amount of the sheets based on height of the lift plate. The control unit controls vertical movement of the lift plate. The control unit controls the lift plate to move upward to a sheet feeding position when feeding the sheet, and after finishing feeding the sheet, moves the lift plate at a waiting position lower than the sheet feeding position during waiting time for waiting for an input of a next print job. In addition, if the sheet detection unit does not detect the sheet when the lift plate is positioned at the sheet feeding position, the control unit sets the waiting position to a lowest position. In addition, if the sheet detection unit detects the sheet and if the remaining amount detection unit detects that the remaining amount of the sheets is a predetermined amount or less, the control unit sets the waiting position to a height position between the sheet feeding position and the lowest position. In addition, if the sheet detection unit detects the sheet and if the remaining amount detection unit detects that the remaining amount of the sheets is more than the predetermined amount, the control unit sets the waiting position to the lowest position.

Other objects of the present disclosure and specific advantages obtained by the present disclosure will become more apparent from the description of the embodiment given below.

DETAILED DESCRIPTION

Hereinafter, with reference to the drawings, an embodiment of a sheet feeding apparatus and an image forming system using the same according to the present disclosure is described.

<1. Structure of Image Forming System>

Figure 1:
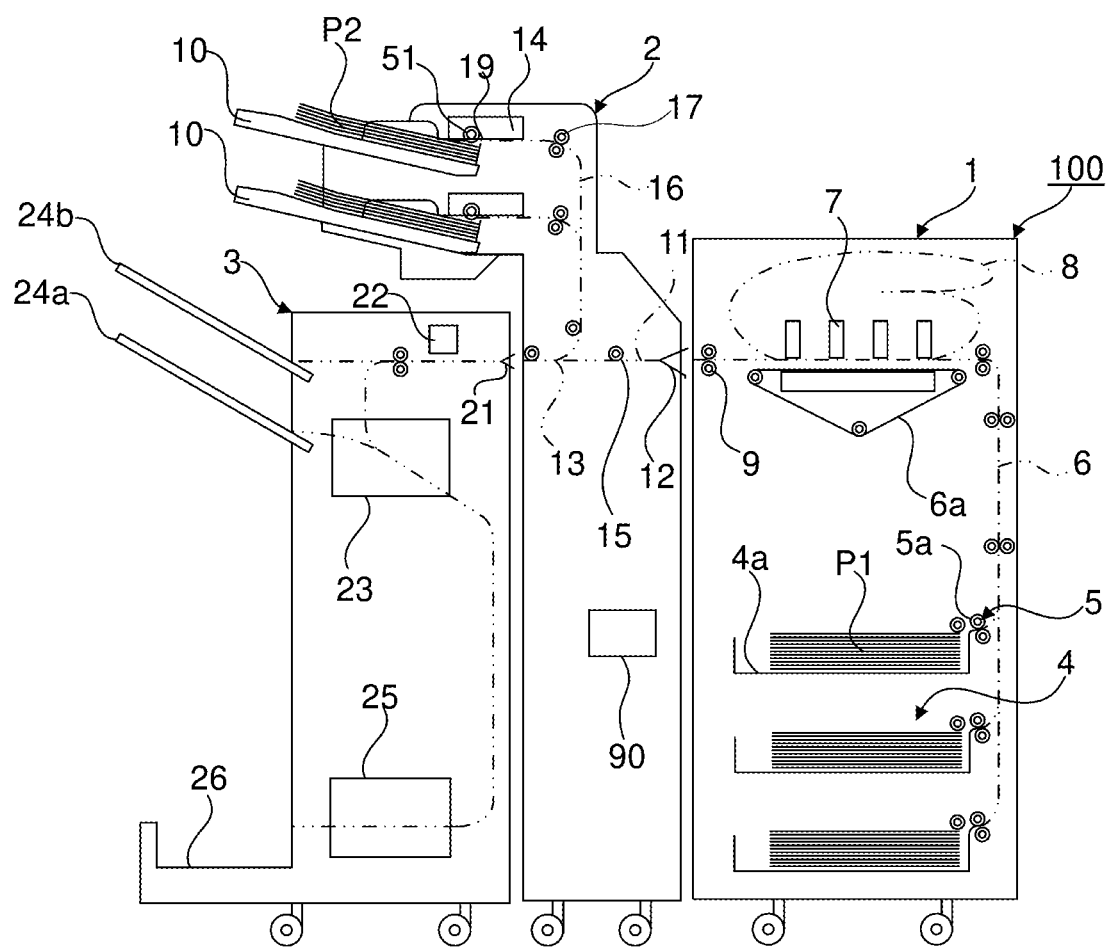
FIG. 1 is a schematic diagram illustrating an inner structure of an image forming system according to an embodiment of the present disclosure.

FIG. 1 is a schematic diagram illustrating an inner structure of an image forming system 100. The image forming system 100 includes an image forming apparatus 1, a sheet feeding apparatus 2, and a paper sheet post processing apparatus 3. Note that this embodiment describes the image forming system 100 in a case adopting an inkjet recording type printer as the image forming apparatus, but it is possible to adopt other types of image forming apparatus (such as a laser printer, a copier, or a facsimile machine).

In addition, a direction in which an output sheet P1 output from the image forming apparatus 1 and an insert sheet P2 inserted from the sheet feeding apparatus 2 are conveyed to the paper sheet post processing apparatus 3 is referred to as a sheet conveying direction. Further, the paper sheet post processing apparatus 3 is regarded as a downstream side in the sheet conveying direction, while a paper sheet storing unit 4 for storing the output sheets P1 in the image forming apparatus 1, and a sheet loading unit 10 for loading the insert sheets P2 in the sheet feeding apparatus 2 are referred to as an upstream side in the sheet conveying direction.

The downstream side of the image forming apparatus 1 is connected to the sheet feeding apparatus 2. The downstream side of the sheet feeding apparatus 2 is connected to the paper sheet post processing apparatus 3.

<1-1. Structure of Image Forming Apparatus>

The image forming apparatus 1 includes the paper sheet storing unit 4, a paper sheet conveying path 6, a paper sheet feeding unit 5, an image recording unit 7, and a reverse conveying unit 8. The paper sheet storing unit 4 is disposed in a lower part of the image forming apparatus 1. The paper sheet conveying path 6 is disposed on a side of the paper sheet storing unit 4 and extends toward the downstream side in the sheet conveying direction. The paper sheet feeding unit 5 is disposed between the paper sheet conveying path 6 and the paper sheet storing unit 4. The image recording unit 7 is disposed to face the paper sheet conveying path 6 in a height direction. The reverse conveying unit 8 branches from the paper sheet conveying path 6 and extends above the image recording unit 7.

The paper sheet storing unit 4 includes a plurality of (e.g. three) paper sheet feed cassettes 4a, in which a plurality of the output sheets P1 are stored, disposed in an attachable and detachable manner. The paper sheet feeding unit 5 feeds the output sheet P1 stored in the paper sheet storing unit 4 to the paper sheet conveying path 6, using a feed roller pair 5a disposed on the downstream side of each paper sheet feed cassette 4a in a paper feeding direction.

Below the image recording unit 7, there is disposed an endless conveyor belt 6a stretched around a plurality of rollers including a drive roller. The conveyor belt 6a is provided with a large number of air holes (not shown) for sucking air. The output sheet P1 sent out from the paper sheet feeding unit 5 is sucked and held on the conveyor belt 6a by a paper sheet sucking unit disposed inside the conveyor belt 6a and passes below the image recording unit 7.

The image recording unit 7 includes a plurality of inkjet heads for ejecting ink to the output sheet P1 that is sucked and held on the conveyor belt 6a and is conveyed. The inkjet heads are supplied with four color (cyan, magenta, yellow, and black) inks stored in ink tanks (not shown), respectively, corresponding to the color of the inkjet head.

When printing on both sides of the output sheet P1, the reverse conveying unit 8 switches (switches back) the conveying direction of the output sheet P1 after printing on one side so as to turn over the output sheet P1, and conveys the same to the image recording unit 7 again in a state where the side without a recorded image faces up. The output sheets P1 on which predetermined images are recorded by the image recording unit 7 are discharged by a discharge roller pair 9 one by one.

<1-2. Structure of Sheet Feeding Apparatus>

The sheet feeding apparatus 2 receives the output sheets P1 discharged from the image forming apparatus 1, one by one, and inserts insert sheets P2 such as a cover paper and a back cover paper that are used for binding and a slip paper (insertion paper) for identification between output sheets P1 at predetermined timings. Then, the sheet feeding apparatus 2 conveys the output sheets P1 and the insert sheets P2 to the paper sheet post processing apparatus 3.

The sheet feeding apparatus 2 includes the sheet loading unit 10. The sheet loading unit 10 loads the insert sheets P2. Below the sheet loading unit 10, there are disposed a paper sheet receiving inlet 12 for receiving the output sheet P1 discharged from the image forming apparatus 1, and a relay conveying path 11 for conveying the output sheet P1 from the paper sheet receiving inlet 12 to the paper sheet post processing apparatus 3. The relay conveying path 11 is provided with a relay conveying roller 15. The relay conveying roller 15 conveys the received output sheet P1 to the downstream side.

An insertion conveying path 16 is disposed above the relay conveying path 11. An upstream side end opening 19 of the insertion conveying path 16 is adjacent to the sheet loading unit 10 in the sheet conveying direction. A downstream side end part of the insertion conveying path 16 is a joining part 13 that joins the relay conveying path 11. The insertion conveying path 16 is a connection path between the sheet loading unit 10 and the relay conveying path 11. A sheet feeding unit 14 is disposed above the upstream side end opening 19 of the relay conveying path 11. The sheet feeding unit 14 has a sheet feed roller 51, which is disposed adjacent to the upstream side end opening 19 of the insertion conveying path 16 in the sheet conveying direction. The sheet feeding unit 14 uses the sheet feed roller 51 to feed the insert sheet P2 from the sheet loading unit 10 to the insertion conveying path 16. A conveying roller pair 17 is disposed at a midway position in the sheet conveying direction of the insertion conveying path 16. The insert sheet P2 fed to the insertion conveying path 16 is conveyed by the conveying roller pair 17 to the joining part 13, and is inserted into the relay conveying path 11, so as to be conveyed to the paper sheet post processing apparatus 3.

<1-3. Structure of Paper Sheet Post Processing Apparatus>

The paper sheet post processing apparatus 3 performs a predetermined post process such as a punch hole forming process or a binding process on a plurality of sheets including the plurality of output sheets P1 output from the image forming apparatus 1 and the insert sheets P2 inserted between the output sheets P1.

The paper sheet post processing apparatus 3 includes a paper sheet receiving inlet 21. The paper sheet receiving inlet 21 receives the output sheet P1 and the insert sheet P2 conveyed from the sheet feeding apparatus 2. Inside the paper sheet post processing apparatus 3, there are disposed a punch hole forming device 22, an edge binding unit 23, and a saddle stitch and folding unit 25. The punch hole forming device 22 performs the punch hole forming process on the output sheet P1 and the insert sheet P2 received through the paper sheet receiving inlet 21. The edge binding unit 23 stacks a plurality of the received output sheets P1 and insert sheets P2, aligns edges of the sheets, and staples the edges. The saddle stitch and folding unit 25 staples the center of the sheets and folds the sheets along the staple line to make a book. On a side surface of the paper sheet post processing apparatus 3, a main tray 24a is disposed in a vertically movable manner at an appropriate position for discharging a bundle of sheets, and a sub tray 24b is disposed at a fixed position of an upper part of the paper sheet post processing apparatus 3.

The punch hole forming device 22 is disposed in an upper part of the paper sheet post processing apparatus 3. The output sheet P1 and the insert sheet P2, which have passed through the relay conveying path 11 of the sheet feeding apparatus 2, are supplied through the paper sheet receiving inlet 21 disposed at an upper right part of the paper sheet post processing apparatus 3, and pass through the punch hole forming device 22. If it is selected to discharge the output sheet P1 and the insert sheet P2 onto the sub tray 24b without performing the staple process, the output sheet P1 and the insert sheet P2 are discharged as they are onto the sub tray 24b. If it is selected to perform the staple process, the sheets are conveyed to the edge binding unit 23 or the saddle stitch and folding unit 25 disposed below the punch hole forming device 22.

The edge binding unit 23 is constituted of a stapler, a process tray (which are not shown), and the like. The output sheets P1 and the insert sheets P2 are stacked on the process tray to be bunch of sheets. The front edges of the sheets are aligned and stapled by the stapler disposed at the end part of the process tray, and then the bundle of sheets is discharged along the process tray onto the main tray 24a.

The saddle stitch and folding unit 25 for a saddle stitch and folding process disposed below the edge binding unit 23 is constituted of a saddle stitch stapler, a center folding device, and a paper sheet guide (which are not shown), and the like. The saddle stitch stapler staples the center of the sheets stacked in the paper sheet guide. The bundle of the sheets stapled by the saddle stitch stapler is folded along the staple line to be a book by the center folding device, and then is discharged onto a book tray 26.

Note that the sheet loading unit 10 provided to the sheet feeding apparatus 2 may be a single unit, or it may be possible to adopt a structure in which a plurality of the sheet loading units 10 are disposed as illustrated in FIG. 1. If the structure including the plurality of the sheet loading units 10 is adopted, it may be possible that the sheet loading units 10 load different types of insert sheets, respectively, so as to make books using different insert sheets as cover papers, back cover papers, or the like.

<2. Detailed Structure of Sheet Feeding Apparatus>

Next, the sheet feeding apparatus 2 of the present disclosure is described in detail with reference to FIGS. 2 to 7.

Figure 2:
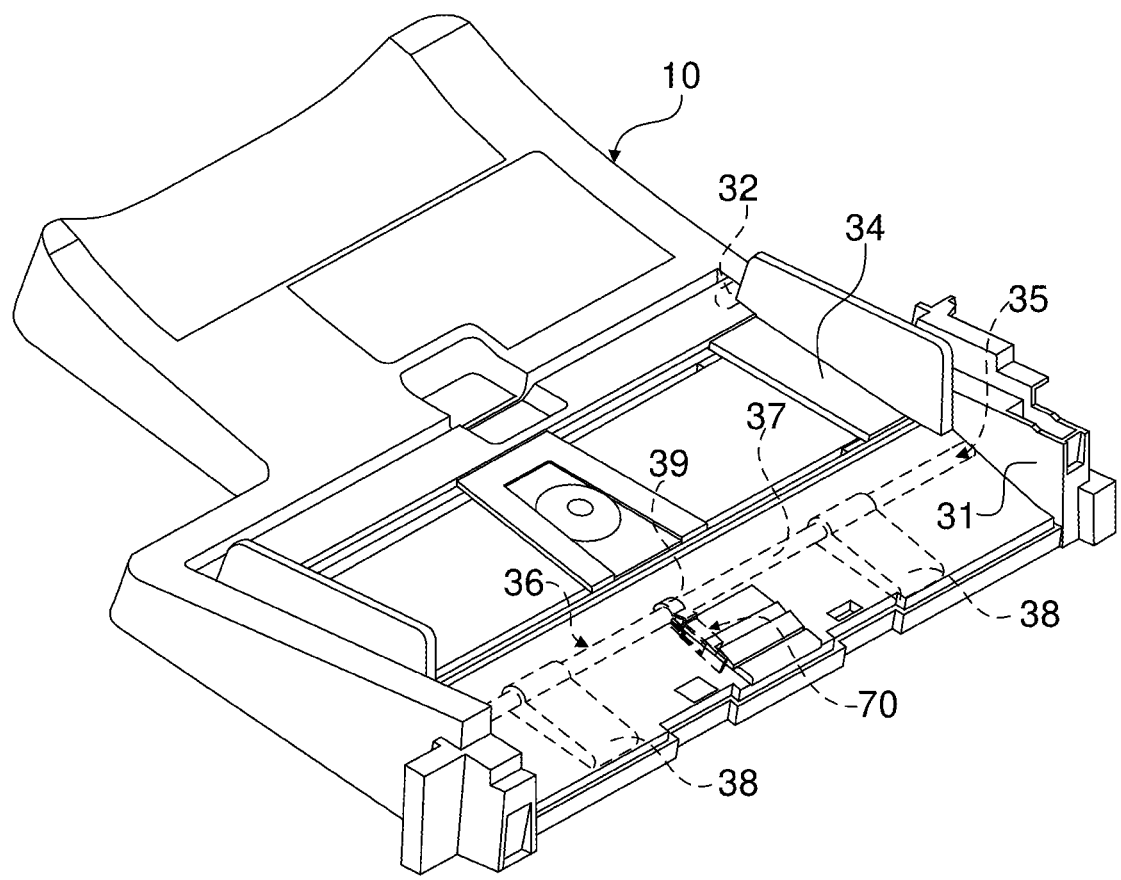
FIG. 2 is a perspective view illustrating a sheet loading unit of a sheet feeding apparatus according to the embodiment of the present disclosure.
Figure 3:
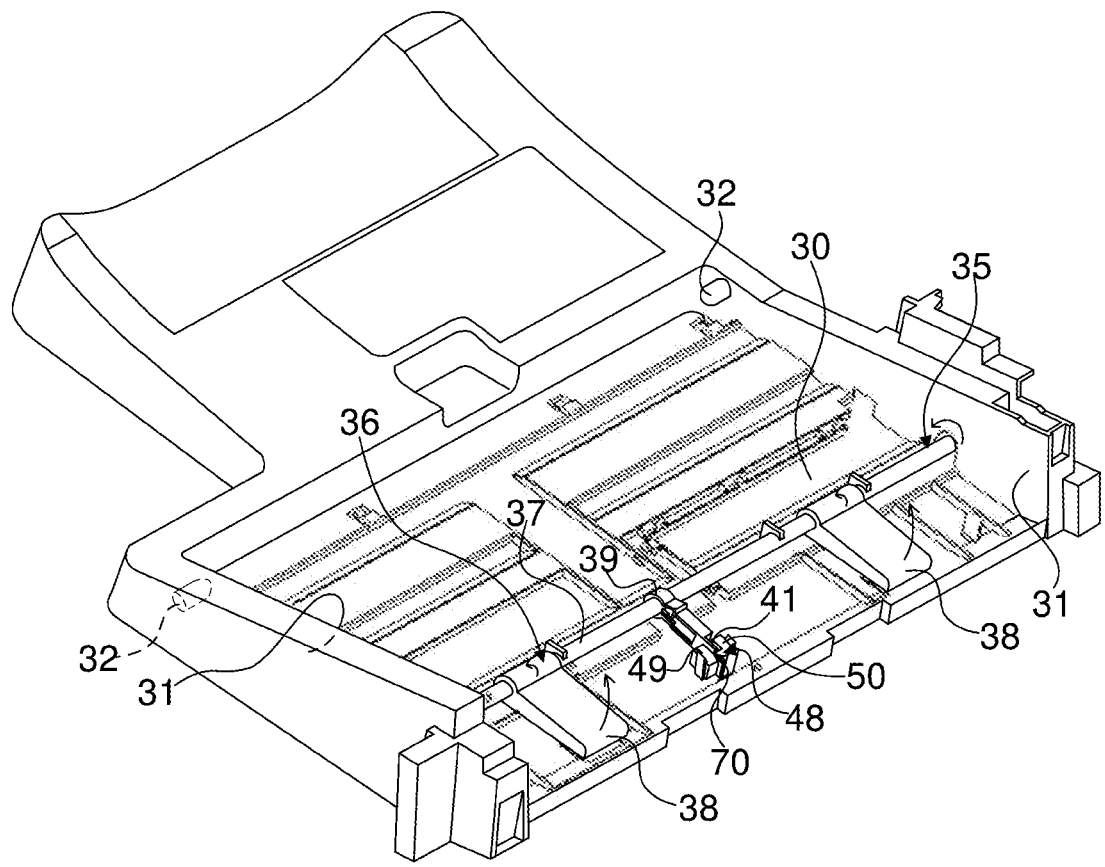
FIG. 3 is a perspective view illustrating the sheet loading unit of the sheet feeding apparatus according to the embodiment of the present disclosure.
Figure 4:
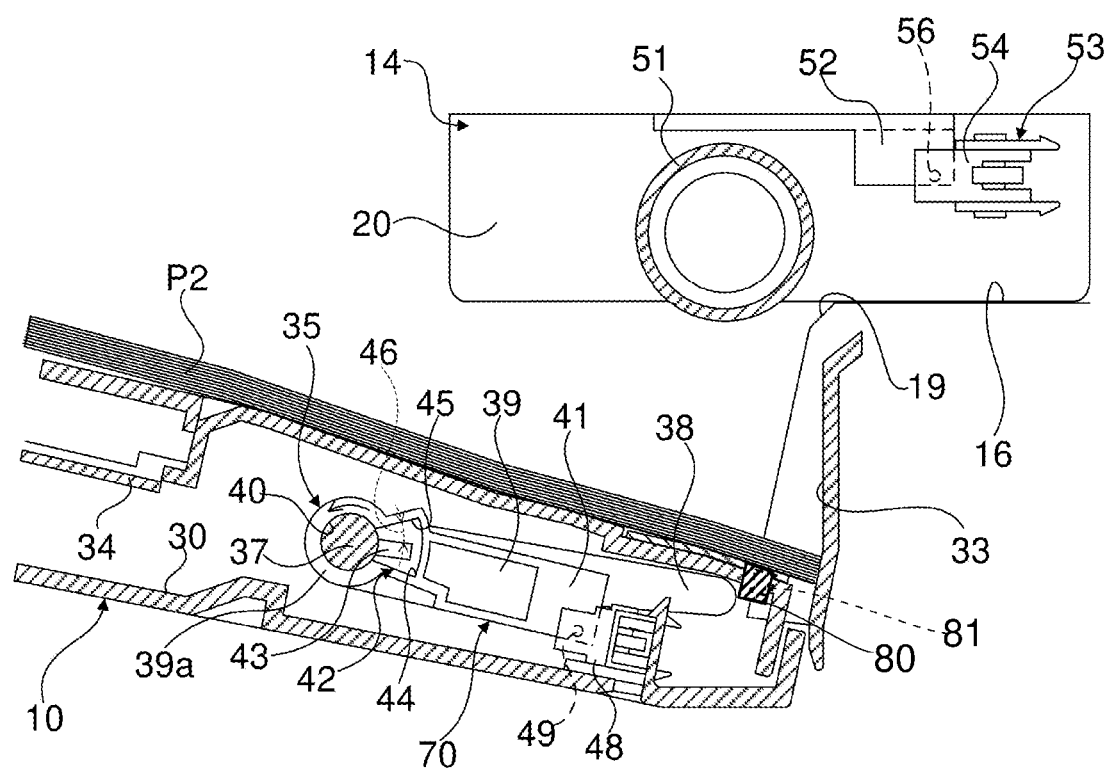
FIG. 4 is a cross-sectional view of the sheet loading unit and its vicinity of the sheet feeding apparatus according to the embodiment of the present disclosure, viewed in a sheet width direction.
Figure 5:
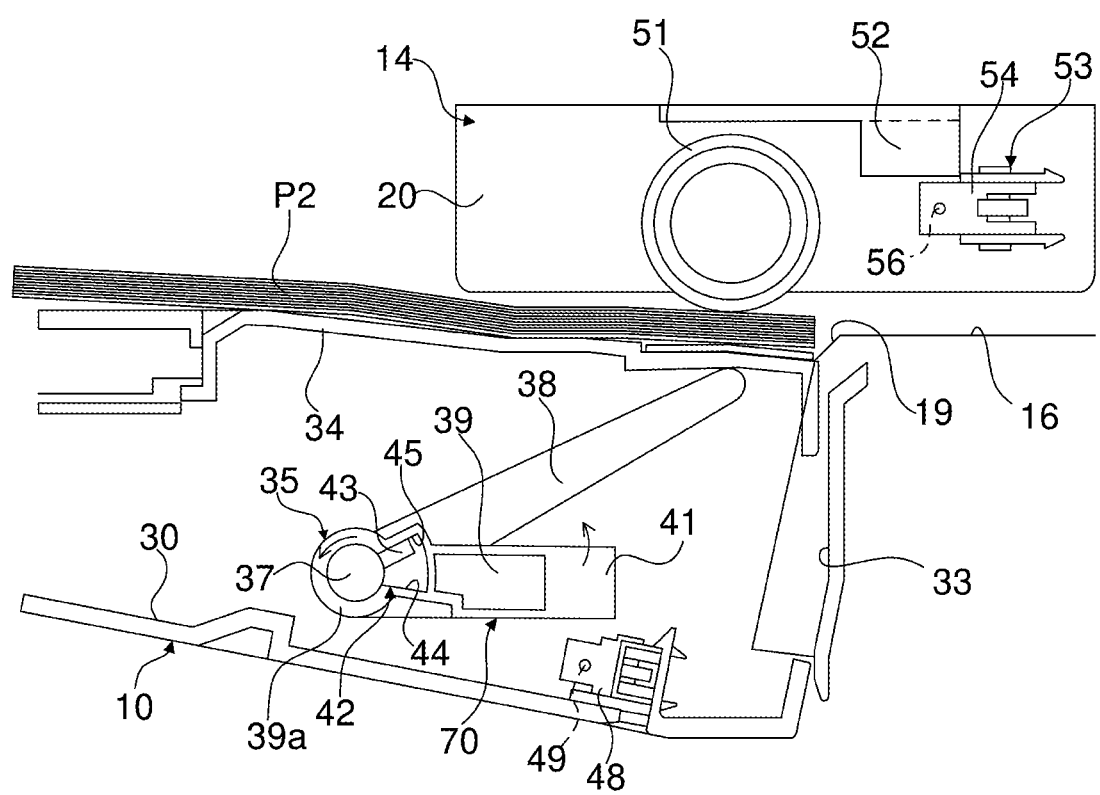
FIG. 5 is a cross-sectional view of the sheet loading unit and its vicinity of the sheet feeding apparatus according to the embodiment of the present disclosure, viewed in the sheet width direction.

FIGS. 2 and 3 are perspective views illustrating the sheet loading unit 10, and a lift plate 34 is not illustrated in FIG. 3. FIGS. 4 and 5 are cross-sectional views of the sheet feeding unit 14 and its vicinity viewed in a sheet width direction. FIG. 4 shows a state where the lift plate 34 is moved downward to a lowest position. In addition, FIG. 5 shows a state where the lift plate 34 is moved upward to a sheet feeding position. The sheet feeding apparatus 2 includes the sheet loading unit 10, the lift plate 34, a lift mechanism 35, the sheet feeding unit 14, a remaining amount detection unit 70, a sheet detection unit 80, and a control unit 90.

<2-1. Structure of Sheet Loading Unit>

The sheet loading unit 10 includes a vertical wall part 33 disposed on the downstream side in the sheet conveying direction, a bottom 30 that is inclined upward from the vertical wall part 33 toward the upstream side in the sheet conveying direction, and a pair of side surfaces 31 facing each other in the sheet width direction (the direction perpendicular to the sheet conveying direction) sandwiching the bottom 30 therebetween. The side surfaces 31 are provided with shaft protrusions 32 protruding therefrom so as to face each other in the sheet width direction. The upstream side end opening 19 of the insertion conveying path 16 is disposed on the upper part of the vertical wall part 33.

<2-2. Structure of Lift Plate>

The lift plate 34 is disposed in the sheet loading unit 10 and is supported in a vertically movable manner. Specifically, the lift plate 34 is disposed above the bottom 30 of the sheet loading unit 10, and is surrounded by the vertical wall part 33 and the pair of side surfaces 31. The insert sheets P2 in the sheet loading unit 10 are stacked on the lift plate 34. The lift plate 34 is adjacent to the vertical wall part 33 of the sheet loading unit 10 in the sheet conveying direction. An upstream side end part of the lift plate 34 in the sheet conveying direction is supported by the shaft protrusions 32 in a rotatable manner. In this way, the lift plate 34 rotates about the shaft protrusions 32. When the lift plate 34 rotates about the shaft protrusions 32, the downstream side end part of the lift plate 34 in the sheet conveying direction moves up and down in the height direction (up and down direction in FIG. 4).

<2-3. Structure of Lift Mechanism>

The lift mechanism 35 moves the downstream side end part of the lift plate 34 vertically, and is disposed between the bottom 30 of the sheet loading unit 10 and the lift plate 34. The lift mechanism 35 includes a drive unit 36 and a plurality of (e.g. two) actuating pieces 38. The drive unit 36 includes a drive source (not shown) such as a motor for generating power, and a drive shaft 37 connected to the drive source in a rotatable manner. The drive shaft 37 is disposed below the lift plate 34, and extends in the sheet width direction in such a manner as to bridge the pair of side surfaces 31. The drive shaft 37 is disposed on the downstream side of the shaft protrusion 32 in the sheet conveying direction. The actuating piece 38 is a rectangular plate-like member elongated in the sheet conveying direction. The upstream side end part of the actuating piece 38 is fixed to the drive shaft 37. The actuating pieces 38 are arranged with a space in the sheet width direction. When the drive shaft 37 rotates, the actuating piece 38 rotates about the drive shaft 37. In this way, the downstream side end part of the actuating piece 38 rocks in the vertical direction (up and down direction in FIG. 4).

As the drive shaft 37 is disposed below the lift plate 34 as described above, the actuating pieces 38 fixed to the drive shaft 37 are also disposed below the lift plate 34. Here, as illustrated in FIG. 5, when the drive source drives the drive shaft 37 to rotate in a counterclockwise direction (in an arrow direction in the diagram), the downstream side end parts of the actuating pieces 38 move upward corresponding to the rotation. Then, the downstream side end parts of the actuating pieces 38 abut the back surface of the lift plate 34, and hence the downstream side end part of the lift plate 34 is lifted up. In this way, the lift mechanism 35 can move the downstream side end part of the lift plate 34 vertically by rocking of the actuating piece 38 using power of the drive source.

<2-4. Structure of Remaining Amount Detection Unit>

The remaining amount detection unit 70 detects remaining amount of the insert sheets P2 stacked in the sheet loading unit 10 on the basis of the height of the lift plate 34. The remaining amount detection unit 70 includes a detection piece 39, a link mechanism 42, and a remaining amount detection sensor 48.

The detection piece 39 is attached to the drive shaft 37 to be adjacent to the actuating piece 38 in the sheet width direction. The detection piece 39 is a small piece elongated in the sheet conveying direction. The detection piece 39 has a through hole 40 formed at a proximal end 39a (the upstream side end part in the sheet conveying direction) so as to extend in the sheet width direction. The drive shaft 37 is inserted in the through hole 40, so that the detection piece 39 is supported by the drive shaft 37 in a rotatable manner about the drive shaft 37. When the detection piece 39 rotates about the drive shaft 37, the downstream side end part of the detection piece 39 rocks in the up and down direction. The downstream side end part of the detection piece 39 moves downward by own weight until it abuts the bottom 30 of the sheet loading unit 10. The downstream side end part of the detection piece 39 is provided with a rectangular plate-like shading part 41 extending toward the downstream side in the sheet conveying direction.

The detection piece 39 and the drive shaft 37 are connected to each other via the link mechanism 42. The link mechanism 42 includes an engaging piece 43 protruding from the drive shaft 37 in a radial direction thereof, and an engaging hole 44 formed at the proximal end 39a of the detection piece 39 for the engaging piece 43 to be inserted. The engaging hole 44 is a concave hole recessed in a protruding direction of the engaging piece 43. An upper surface of an inner circumferential surface of the engaging hole 44 is provided with an engaging surface 45, which faces an outer circumferential surface of the engaging piece 43 in a circumferential direction of the drive shaft.

As illustrated in FIG. 4, when the actuating piece 38 is at a relatively low position, and the lift plate 34 is moved downward to the lowest position, a rotation angle of the drive shaft 37 is relatively small, so that there is a gap 46 (clearance) between the engaging piece 43 and the engaging surface 45. When the drive shaft 37 rotates in the counter-clockwise direction in the diagram from this state, the engaging piece 43 also rotates about the drive shaft 37, and the gap 46 between the outer circumferential surface of the drive shaft 37 and the engaging surface 45 is decreased. When the drive shaft 37 further rotates from this state, the engaging piece 43 abuts the engaging surface 45. Then, as illustrated in FIG. 5, the rotation of the drive shaft 37 is transmitted to the detection piece 39 via the engaging surface 45, and the detection piece 39 rotates about the drive shaft 37. In this way, the detection piece 39 rotates at a timing shifted from rotation of the actuating piece 38 so as to follow the actuating piece 38.

Note that when the drive shaft 37 rotates in a clockwise direction in the diagram, the detection piece 39 moves downward by own weight so as to follow the rocking of the actuating piece 38. Then, as the drive shaft 37 rotates in the clockwise direction also after the detection piece 39 moves downward to abut the bottom 30, the gap 46 is generated again between the outer circumferential surface of the engaging piece 43 and the engaging surface 45.

The remaining amount detection sensor 48 is disposed on the bottom 30 of the sheet loading unit 10 so as to be adjacent to the detection piece 39 in the sheet conveying direction. The remaining amount detection sensor 48 includes a light emitting part 49 and a light receiving part 50 facing each other in the sheet width direction. The light receiving part 50 receives light emitted from the light emitting part 49.

When there is the gap 46 between the engaging piece 43 and the engaging surface 45, the shading part 41 of the detection piece 39 is inserted between the light receiving part 50 and the light emitting part 49 of the remaining amount detection sensor 48. In other words, when the rotation angle of the drive shaft 37 is relatively small so that the rotation of the drive shaft 37 is not transmitted to the detection piece 39, the shading part 41 of the detection piece 39 is at the same height as the light emitting part 49 of the remaining amount detection sensor 48. Therefore, the light emitted from the light emitting part 49 is blocked by the shading part 41, and hence the light receiving part 50 cannot receive the light emitted from the light emitting part 49. In this case, the remaining amount detection sensor 48 is in off state.

When the drive shaft 37 rotates from this state as described above, so that the shading part 41 moves to a position higher than the light emitting part 49 (see FIG. 5), the light receiving part 50 receives the light emitted from the light emitting part 49. In this way, the remaining amount detection sensor 48 detects that the detection piece 39 has moved at a position higher than the light emitting part 49, and hence it is possible to detect upward movement of the downstream side end part of the actuating piece 38, i.e., to detect that the lift plate 34 has moved higher than a predetermined height. In this case, the remaining amount detection sensor 48 becomes on state.

<2-5. Structure of Sheet Detection Unit>

The sheet detection unit 80 is disposed at the downstream side end part of the lift plate 34, so as to detect whether or not the sheet is placed on the lift plate 34. Specifically, the sheet detection unit 80 includes a reflection type sensor 81. The reflection type sensor 81 is a reflection type optical sensor for detecting reflection light from the under surface of the insert sheet P2. The reflection type sensor 81 includes a light emitting part (not shown) and a light receiving part (not shown). The light emitting part emits light toward the under surface of the insert sheet P2. The light receiving part detects light reflected by the under surface of the insert sheet P2.

If the reflection type sensor 81 detects the light emitted to and reflected by the under surface of the insert sheet P2 (If the reflection type sensor 81 is in on state), it is determined that the insert sheet P2 is placed on the lift plate 34. In addition, if the reflection type sensor 81 does not detect the light emitted to and reflected by the under surface of the insert sheet P2 (If the reflection type sensor 81 is in off state), it is determined that the insert sheet P2 is not placed on the lift plate 34.

The sheet detection unit 80 is provided to the lift plate 34, and it is disposed in a vertically movable manner together with the lift plate 34. The reflection type sensor 81 can detect the insert sheet P2 within a predetermined detection distance. The detection distance of the reflection type sensor 81 is set to be shorter than a distance between the sheet feeding position and the lowest position, and longer than a distance between the sheet feeding position and a waiting position. Note that the sheet detection unit 80 may be disposed at a position other than the downstream side end part of the lift plate 34.

In addition, the sheet detection unit 80 may be constituted of an actuator (not shown) and the reflection type sensor 81, for example. The actuator contacts with the insert sheet P2 placed on the lift plate 34, and it rocks. The reflection type sensor 81 detects that the rocking actuator blocks a light path.

In this case, when the reflection type sensor 81 detects that the actuator blocks the light path (that the reflection type sensor 81 is in off state), it is determined that the insert sheet P2 is placed on the lift plate 34. In addition, when the reflection type sensor 81 detects that the actuator does not block the light path (that the reflection type sensor 81 is in on state), it is determined that the insert sheet P2 is not placed on the lift plate 34.

<2-6. Structure of Sheet Feeding Unit>

The sheet feeding unit 14 includes a unit main body 20 disposed above the lift plate 34, the sheet feed roller 51 provided to the unit main body 20, and a shading piece 52 protruding from the unit main body 20 in the sheet width direction. The unit main body 20 is disposed in a vertically movable manner in the up and down direction in the diagram. The sheet feed roller 51 is adjacent to the upstream side end opening 19 of the insertion conveying path 16 in the sheet conveying direction.

A lift sensor 54 is disposed at a position facing the unit main body 20 in the sheet width direction. The lift sensor 54 includes a light emitting part 56 and a light receiving part (not shown) facing each other in the sheet width direction. The light receiving part of the lift sensor 54 receives light emitted from the light emitting part 56. The lift sensor 54 and the shading piece 52 constitute a top surface detection mechanism 53. The top surface detection mechanism 53 can detect that the unit main body 20 is at a position higher than a predetermined height with the sheet feed roller 51 contacting with the insert sheet P2.

As illustrated in FIG. 4, when the sheet feed roller 51 does not contact with the top surface of the insert sheet P2, the shading piece 52 is inserted between the light receiving part and the light emitting part 56 of the lift sensor 54. In this way, the shading piece 52 blocks the light emitted from the light emitting part 56 of the lift sensor 54.

Figure 6:
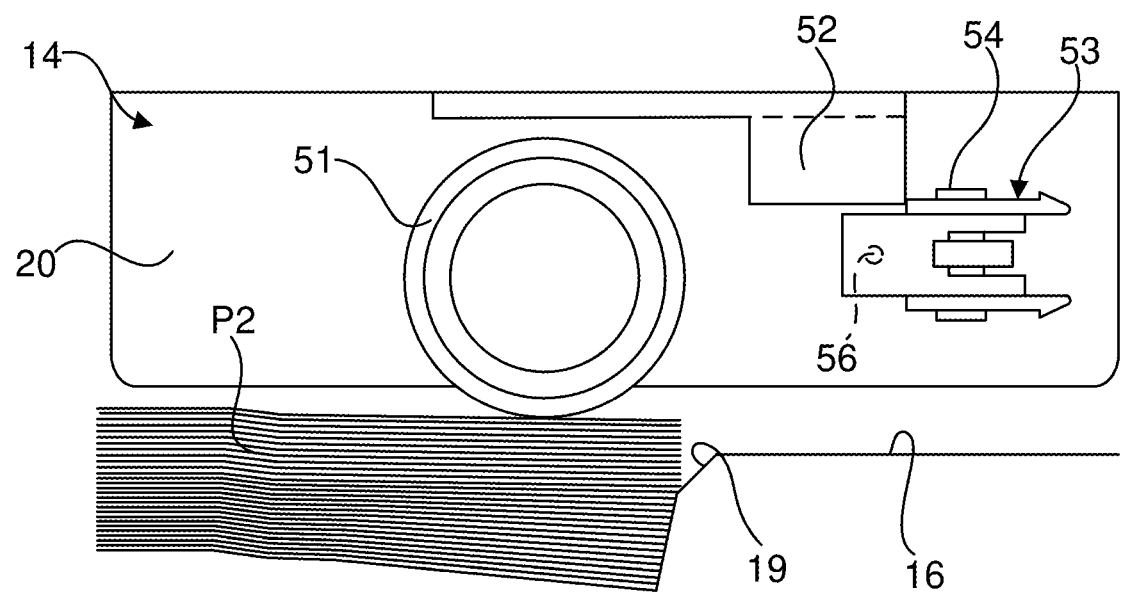
FIG. 6 is a partial enlarged view illustrating a sheet feeding unit and its vicinity of the sheet feeding apparatus according to the embodiment of the present disclosure.
Figure 7:
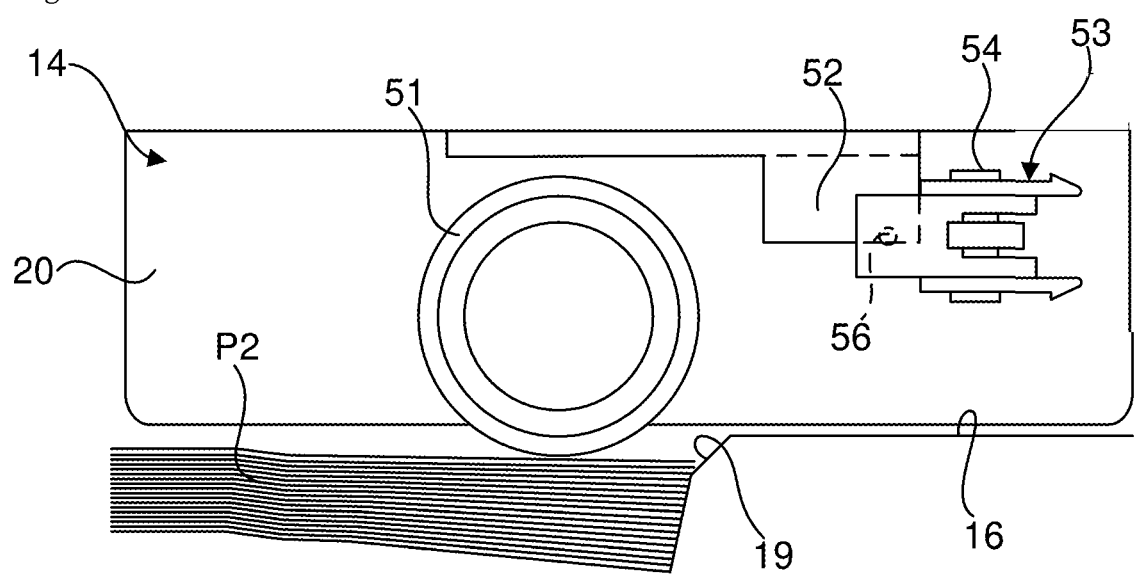
FIG. 7 is a partial enlarged view illustrating the sheet feeding unit and its vicinity of the sheet feeding apparatus according to the embodiment of the present disclosure.

FIGS. 6 and 7 are partial enlarged views illustrating the sheet feeding unit 14 and its vicinity. FIG. 6 shows a state where the light receiving part of the lift sensor 54 receives the light emitted from the light emitting part 56. FIG. 7 shows a state where the shading piece 52 blocks the light emitted from the light emitting part 56 of the lift sensor 54.

As illustrated in FIG. 6, when the top surface of the insert sheet P2 is contacted with the sheet feed roller 51, the sheet feed roller 51 rotates in the sheet conveying direction (the counterclockwise direction in the diagram), and hence one insert sheet P2 that is contacted with the sheet feed roller 51 is fed to the upstream side end opening 19 of the relay conveying path 11. When the insert sheet P2 is fed, another insert sheet P2 that was under the fed insert sheet P2 contacts with the sheet feed roller 51. In this way, while the sheet feed roller 51 is rotating continuously, the insert sheets P2 on the sheet loading unit 10 are fed one by one in order from the top one. Therefore, the sheet feed roller 51 can feed the plurality of insert sheets P2 to the insertion conveying path 16 one by one continuously from the top insert sheet P2. In this case, the lift sensor 54 becomes on state.

When the insert sheets P2 in the sheet loading unit 10 are fed to the insertion conveying path 16 one by one from the state of FIG. 6, so that remaining amount of the insert sheets P2 is reduced, position of the top surface of the insert sheets P2 in the sheet loading unit 10 is lowered. Then, force pressing the sheet feed roller 51 is weakened so that the unit main body 20 moves downward. When the unit main body 20 moves downward so that the shading piece 52 is inserted between the light receiving part and the light emitting part 56 of the lift sensor 54 again as illustrated in FIG. 7, the light emitted from the light emitting part 56 is blocked by the shading piece 52. In this case, the lift sensor 54 becomes off state.

<2-8. Structure of Control Unit>

The control unit 90 is connected to the drive source, the reflection type sensor 81, the remaining amount detection sensor 48, and the lift sensor 54. On the basis of detection results of the reflection type sensor 81, the remaining amount detection sensor 48, and the lift sensor 54, the control unit 90 controls drive of the drive source so as to control the lift plate 34 to move up and down.

When a print command is input by a user to the image forming system 100, the sheet feeding apparatus 2 inserts the insert sheet P2 between the output sheets P1 conveyed from the image forming apparatus 1, at a predetermined timing.

In a waiting state before the print command is input, the lift plate 34 is separate from the sheet feeding unit 14 and is moved downward to the waiting position at which the remaining amount detection sensor 48 is in off state. In this case, the unit main body 20 is moved downward so that the lift sensor 54 is in off state.

When the print command is input, the control unit 90 controls the lift plate 34 to move upward, and stops the upward movement of the lift plate 34 when the lift sensor 54 becomes on state. In this case, if the remaining amount of the insert sheets P2 is less than a predetermined amount, the remaining amount detection sensor 48 becomes on state (see FIG. 5).

Figure 8:
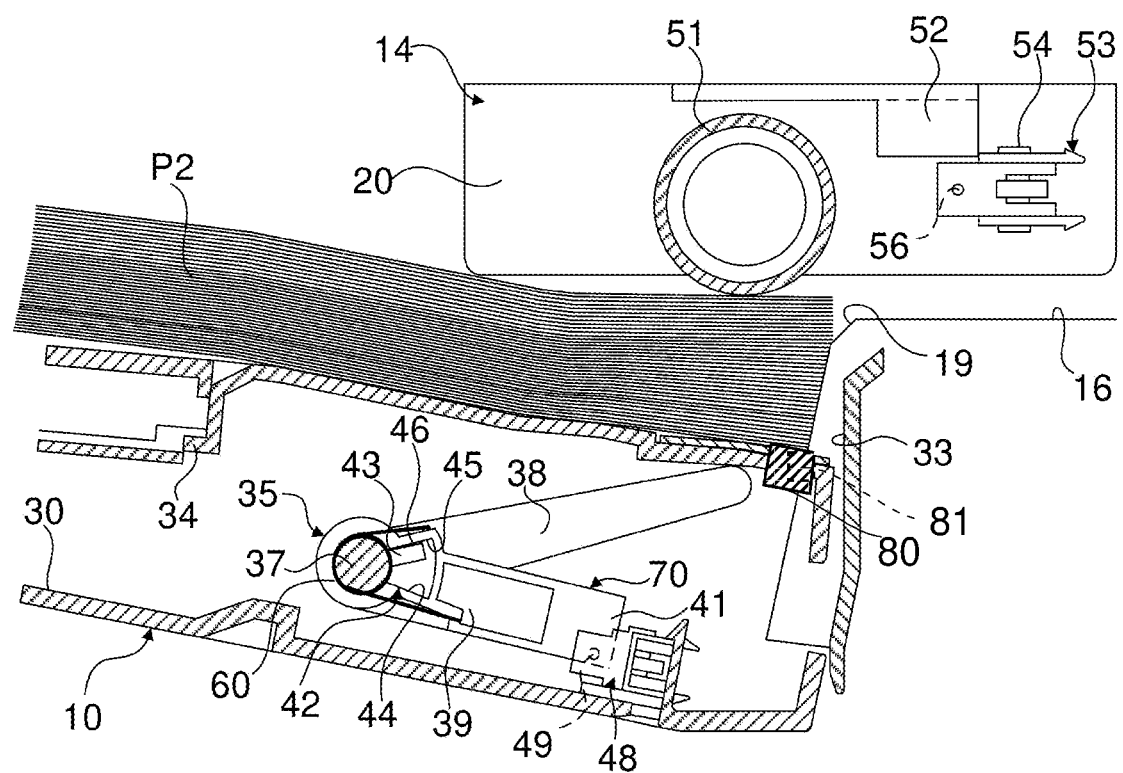
FIG. 8 is a cross-sectional view of the sheet loading unit and its vicinity of the sheet feeding apparatus according to the embodiment of the present disclosure, viewed in the sheet width direction.

FIG. 8 is a cross-sectional view of the sheet loading unit 10 viewed in the sheet width direction, and shows a state where the remaining amount of the insert sheets P2 is more than the predetermined amount. The control unit 90 controls the lift plate 34 to move upward until the top surface of the insert sheets P2 contacts with the sheet feed roller 51 so that the lift sensor 54 becomes on state. If the remaining amount of the insert sheets P2 is more than the predetermined amount, the lift plate 34 moves upward only to a position lower than the predetermined height. In this case, the small gap 46 is formed between the outer circumferential surface of the engaging piece 43 and the engaging surface 45 so that the rotation of the drive shaft 37 is not transmitted to the detection piece 39. Therefore, the shading part 41 of the detection piece 39 is not moved upward but is inserted between the light receiving part 50 and the light emitting part 49 of the remaining amount detection sensor 48. Thus, the remaining amount detection sensor 48 is in off state.

From this state, the sheet feed roller 51 rotates in the sheet conveying direction so as to feed the insert sheets P2 one by one, and hence the top surface of the insert sheets P2 is lowered. Therefore, the control unit 90 controls the lift plate 34 to move upward. In this case, the control unit 90 controls the drive source to rotate the drive shaft 37, and hence the gap 46 between the outer circumferential surface of the engaging piece 43 and the engaging surface 45 is decreased.

When the drive shaft 37 further rotates and the outer circumferential surface of the engaging piece 43 contacts with the engaging surface 45 so that the gap 46 is canceled, the rotation of the drive shaft 37 is transmitted to the detection piece 39. As the drive shaft 37 further rotates from this state, the detection piece 39 gradually rotates. When the remaining amount of the insert sheets P2 becomes less than the predetermined amount, the shading part 41 of the detection piece 39 becomes a position higher than the light emitting part 49 of the remaining amount detection sensor 48, so that the remaining amount detection sensor 48 becomes on state.

The control unit 90 can determine that the remaining amount in the sheet loading unit 10 becomes less than or equal to the predetermined amount on the basis of a detection result of the remaining amount detection sensor 48. In other words, if the lift sensor 54 is in on state and if the remaining amount detection sensor 48 is in off state, it is determined that the remaining amount of the insert sheets P2 is more than the predetermined amount. In addition, if the lift sensor 54 is in on state and if the remaining amount detection sensor 48 is in on state, it is determined that the remaining amount of the insert sheets P2 is less than the predetermined amount.

Figure 9:
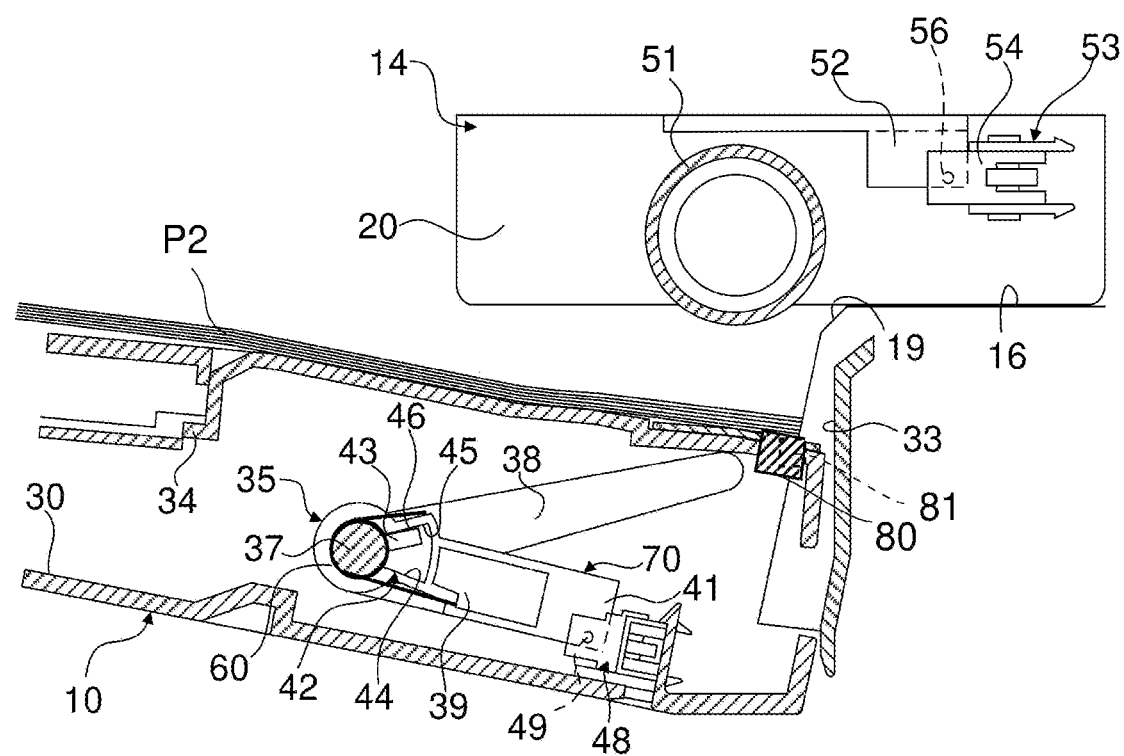
FIG. 9 is a cross-sectional view of the sheet loading unit and its vicinity of the sheet feeding apparatus according to the embodiment of the present disclosure, viewed in the sheet width direction.
Figure 10:
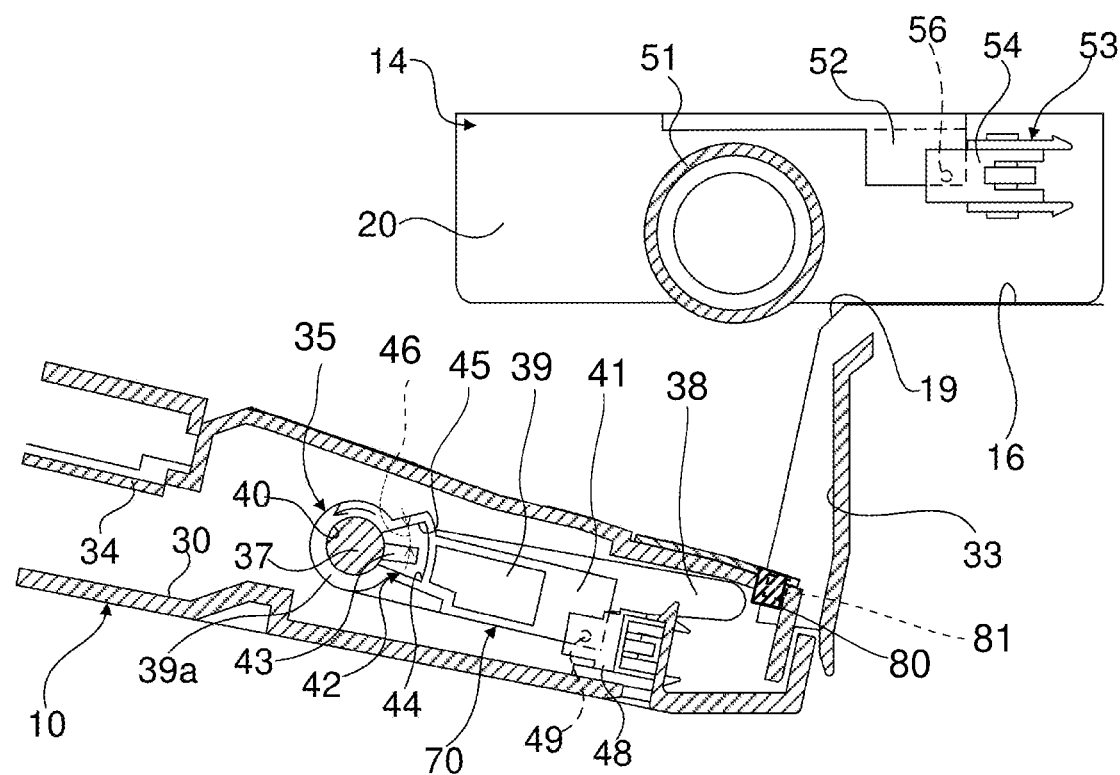
FIG. 10 is a cross-sectional view of the sheet loading unit and its vicinity of the sheet feeding apparatus according to the embodiment of the present disclosure, viewed in the sheet width direction.

FIGS. 9 and 10 are cross-sectional views illustrating the sheet loading unit 10 viewed in the sheet width direction, and shows a waiting state after the print job is finished. When the print job is finished in the image forming system 100, the control unit 90 controls the lift plate 34 to move downward to the waiting position and waits an input of the next print job. In other words, the control unit 90 controls the lift plate 34 to move upward to the sheet feeding position when feeding the sheet, and sets the lift plate 34 at the waiting position below the sheet feeding position in the waiting time for waiting the input of the next print job. In this case, the control unit 90 determines whether or not the insert sheet P2 is placed on the lift plate 34 in the state where the lift plate 34 is set at the sheet feeding position, and determines whether or not the remaining amount of the insert sheets P2 stacked on the lift plate 34 is more than the predetermined amount. Further, on the basis of determination results, the control unit 90 controls the waiting position of the lift plate 34.

If the reflection type sensor 81 is in off state, the control unit 90 determines that the insert sheet P2 is not placed on the lift plate 34, sets the waiting position of the lift plate 34 to the lowest position, and controls the lift plate 34 to move downward (see FIG. 10). In this way, convenience for the user to refill the insert sheets P2 to the sheet loading unit 10 can be improved.

In contrast, if the reflection type sensor 81 is in on state, it is further determined whether or not the remaining amount of the insert sheets P2 stacked on the lift plate 34 is more than the predetermined amount. Specifically, if the lift sensor 54 is in on state and if the remaining amount detection sensor 48 is in off state, it is determined that the remaining amount of the insert sheets P2 is more than the predetermined amount. If the lift sensor 54 is in on state and if the remaining amount detection sensor 48 is in on state, it is determined that the remaining amount of the insert sheets P2 is less than the predetermined amount.

If it is determined that the remaining amount of the insert sheets P2 is less than the predetermined amount, the control unit 90 controls the lift plate 34 to stop at a position higher than the lowest position (see FIG. 9). In other words, the control unit 90 sets the waiting position to a height position between the sheet feeding position and the lowest position. Specifically, the control unit 90 controls the lift plate 34 to stop moving down when the remaining amount detection sensor 48 changes from on state to off state. As the lift plate 34 waits at the high position, it is possible to shorten the time necessary for starting sheet feeding when the next print job is input.

In contrast, if it is determined that the remaining amount of the insert sheets P2 is more than the predetermined amount, the waiting position of the lift plate 34 is set to the lowest position, and the lift plate 34 is moved down.

By determining whether or not the insert sheet P2 is placed on the lift plate 34 in the state where the lift plate 34 is at the sheet feeding position after the print job is finished, the control unit 90 can determine that the insert sheet P2 is placed on the lift plate 34 in the case, for example, where the printing is finished in the state where the insert sheet P2 extends over the upstream side end opening 19 of the insertion conveying path 16 and the lift plate 34.

In this case, the detection distance of the reflection type sensor 81 is shorter than the distance between the sheet feeding position and the lowest position, and is longer than the distance between the sheet feeding position and the waiting position. Therefore, by allowing the lift plate 34 to wait at a high position, the sheet extending over the upstream side end opening 19 of the insertion conveying path 16 and the lift plate 34 can be easily detected. In addition, cost increase can be suppressed by using the reflection type sensor 81 having a short detection distance. Further, when the next print job is input, the time for starting feeding the insert sheet P2 extending over the upstream side end opening 19 of the insertion conveying path 16 and the lift plate 34 can be shortened.

Note that during waiting for an input of the print job, if the reflection type sensor 81 becomes off state due to removal of the insert sheet P2 or other reason, for example, the control unit 90 sets the waiting position of the lift plate 34 to the lowest position and controls the lift plate 34 to move down. In this way, convenience for the user to refill the insert sheets P2 to the sheet loading unit 10 is improved.

In addition, when the control unit 90 receives notification of power off (including a case of receiving notification of jamming occurrence), the control unit 90 sets the waiting position of the lift plate 34 to the lowest position and controls the lift plate 34 to move down, even if the reflection type sensor 81 is in on state.

After that, when receiving notification of power on (including a case of receiving notification that a jamming treatment is finished), the control unit 90 determined whether or not the insert sheet P2 is placed on the lift plate 34. If the reflection type sensor 81 is in off state, the lift plate 34 is made to wait at the lowest position.

In contrast, if the reflection type sensor 81 is in on state, the lift plate 34 is made to move upward until the lift sensor 54 becomes on state. In this case, the control unit 90 determines the remaining amount of the sheet loading unit 10 on the basis of a detection result of the remaining amount detection sensor 48, and controls the waiting position of the lift plate 34.

Specifically, if the remaining amount detection sensor 48 is in off state, it is determined that the remaining amount of the insert sheets P2 is more than the predetermined amount. If the remaining amount detection sensor 48 is in on state, it is determined that the remaining amount of the insert sheets P2 is less than the predetermined amount. In this case, the waiting position of the lift plate 34 when determining that the remaining amount of the insert sheets P2 is less than the predetermined amount is set higher than that when determining that the remaining amount of the insert sheets P2 is more than the predetermined amount. In this way, even if the remaining amount of the insert sheets P2 is less than the predetermined amount, the time for starting feeding the sheet when the next print job is input can be shortened.

According to this embodiment, the control unit 90 controls the waiting position before the sheet feeding operation of the lift plate on the basis of a detection result of the sheet detection unit 80 including the reflection type sensor 81. In this way, if the insert sheet (sheet) P2 is placed on the lift plate 34, the lift plate 34 can be made to wait at the position where the time for starting feeding the sheet when the next print job is input can be shortened. In addition, if the insert sheet (sheet) is not placed on the lift plate 34, the lift plate 34 can be made to wait at the position that is convenient for the user to refill the insert sheets.

In addition, the control unit 90 controls the waiting position on the basis of a detection result of the sheet detection unit 80 and a detection result of the remaining amount detection unit 70 including the remaining amount detection sensor 48, and hence can control the lift plate 34 to wait at the position where the time for starting feeding the sheet when the next print job is input can be shortened, in accordance with the remaining amount of the insert sheets P2.

In addition, when the control unit 90 receives the notification of power on or notification that the jamming treatment is finished, and if the sheet detection unit 80 detects that the insert sheet P2 is not placed on the lift plate 34, the control unit 90 sets the waiting position to the lowest position. If the sheet detection unit 80 detects that the insert sheet P2 is placed on the lift plate 34, the control unit 90 controls the waiting position on the basis of a detection result of the remaining amount detection unit 70. In this way, when power is turned on or when a jamming treatment is finished, the lift plate 34 can be made to wait at the position where the time for starting feeding the sheet when the next print job is input can be shortened.

In addition, the control unit 90 sets the waiting position to a higher position when the sheet detection unit 80 detects that the insert sheet P2 is placed on the lift plate 34, than when the sheet detection unit 80 detects that the insert sheet P2 is not placed on the lift plate 34. In this way, the time for starting feeding the sheet when the next print job is input can be shortened.

In addition, if the sheet detection unit 80 detects that the insert sheet P2 is not placed on the lift plate 34, when the control unit 90 receives the notification of power on or the notification that the jamming treatment is finished, the control unit 90 sets the waiting position to the lowest position, and hence convenience for the user to refill the insert sheets P2 to the sheet loading unit 10 is improved.

Other than that, the present disclosure is not limited to the embodiment described above but can be variously modified within the scope of the present disclosure without deviating from the spirit thereof.

The present disclosure can be applied to sheet feeding apparatuses for inserting an insert sheet between output sheets output from an image forming apparatus, at a predetermined timing.

What is claimed is:

1. A sheet feeding apparatus comprising:
a sheet loading unit for loading sheets;
a lift plate disposed in the sheet loading unit and supported in a vertically movable manner;
a lift mechanism for moving the lift plate up and down;
a sheet feeding unit disposed above the lift plate so as to face the same, for contacting and feeding the sheet lifted by the lift plate;
a sheet detection unit disposed on the lift plate so as to detect whether or not the sheet is placed on the lift plate;
a remaining amount detection unit for detecting a remaining amount of the loaded sheets based on height of the lift plate; and
a control unit configured to control the up and down movement of the lift plate, wherein
the control unit controls the lift plate to move upward to a sheet feeding position when feeding the sheet, and after finishing feeding the sheet, moves the lift plate at a waiting position lower than the sheet feeding position during waiting time for waiting for an input of a next print job,
if the sheet detection unit does not detect the sheet when the lift plate is positioned at the sheet feeding position, the control unit sets the waiting position to a lowest position,
if the sheet detection unit detects the sheet and if the remaining amount detection unit detects that the remaining amount of the sheets is a predetermined amount or less, the control unit sets the waiting position to a height position between the sheet feeding position and the lowest position, and
if the sheet detection unit detects the sheet and if the remaining amount detection unit detects that the remaining amount of the sheets is more than the predetermined amount, the control unit sets the waiting position to the lowest position.

2. The sheet feeding apparatus according to claim 1, wherein
the sheet detection unit includes a reflection type sensor, which has a light emitting part for emitting light to an under surface of the sheet and a light receiving part for detecting light reflected from the under surface of the sheet,
the reflection type sensor is disposed in a vertically movable manner together with the lift plate, and is capable of detecting the sheet within a predetermined detection distance, and
the detection distance is shorter than a distance between the sheet feeding position and the lowest position, and is longer than a distance between the sheet feeding position and the waiting position.

3. The sheet feeding apparatus according to claim 2, wherein
when the control unit is energized, in a case where the sheet detection unit does not detect the sheet, the control unit sets the waiting position to the lowest position, and in a case where the sheet detection unit detects the sheet, the control unit controls a height of the waiting position on the basis of a detection result of the remaining amount detection unit.

4. An image forming system comprising:
an image forming apparatus for forming images on sheets;
a sheet post processing apparatus for performing a predetermined post process on a bunch of the sheets output from the image forming apparatus; and
the sheet feeding apparatus according to claim 2, as an inserter connected to the sheet post processing apparatus so as to insert a sheet between the sheets.

5. An image forming system comprising:
an image forming apparatus for forming images on sheets;
a sheet post processing apparatus for performing a predetermined post process on a bunch of the sheets output from the image forming apparatus; and
the sheet feeding apparatus according to claim 3, as an inserter connected to the sheet post processing apparatus so as to insert a sheet between the sheets.

6. The sheet feeding apparatus according to claim 1, wherein the control unit moves the lift plate down to the waiting position in a case where the sheet detection unit detects the sheet, and then in a case where the sheet detection unit does not detect the sheet, the control unit sets the waiting position to the lowest position.

7. An image forming system comprising:
an image forming apparatus for forming images on sheets;
a sheet post processing apparatus for performing a predetermined post process on a bunch of the sheets output from the image forming apparatus; and the sheet feeding apparatus according to claim 6, as an inserter connected to the sheet post processing apparatus so as to insert a sheet between the sheets.

8. The sheet feeding apparatus according to claim 1, wherein
when receiving a notification of power off, the control unit sets the waiting position to the lowest position.

9. An image forming system comprising:
an image forming apparatus for forming images on sheets;
a sheet post processing apparatus for performing a predetermined post process on a bunch of the sheets output from the image forming apparatus; and
the sheet feeding apparatus according to claim 8, as an inserter connected to the sheet post processing apparatus so as to insert a sheet between the sheets.

10. An image forming system comprising:
an image forming apparatus for forming images on sheets;
a sheet post processing apparatus for performing a predetermined post process on a bunch of the sheets output from the image forming apparatus; and
the sheet feeding apparatus according to claim 1, as an inserter connected to the sheet post processing apparatus so as to insert a sheet between the sheets.

* * * * *